Patented June 25, 1940

2,205,855

UNITED STATES PATENT OFFICE 2,205,855

VAT DYESTUFFS OF THE ANTHRAQUINONE SERIES

Karl Kuppe, Cologne-Lindenthal, Germany, assignor to General Aniline & Film Corporation, a corporation of Delaware No Drawing. Application June 21, 1938, Serial No. 214,941. In Germany June 25, 1937

4 Claims. (Cl. 260—368)

This invention relates to new valuable vat dyestuffs of the anthraquinone series.

According to my present invention new and valuable vat dyestuffs are obtained by condensing 1,5-diacylamino-3,7-dihalogenanthraquinones and 1,8 - diacylamino - 3,6 - dihalogenanthraquinones with aminoanthraquinones or substitution products thereof. Depending on the amounts of the starting materials employed one or both halogen atoms are replaced by an amino anthraquinone.

The reaction is carried out in an alkaline medium preferably in the presence of a copper salt as a catalyst. A preferred embodiment consists in carrying out the reaction in the presence of a high boiling solvent such as nitrobenzene.

My new compounds correspond to one of the following both general formulae

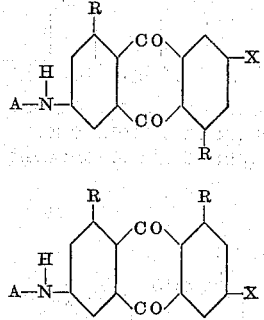

and wherein R represents an acylamino group, A represents an anthraquinone, and X stands for the group

—NH.A (A indicating an anthraquinone) or for a halogen. As acylamino groups there come into consideration such as are derived from aliphatic or aromatic carboxylic acids. Compounds bearing benzoylamino groups are of special importance.

The products obtained may be subjected to an after-treatment with agents effecting condensation, as, for instance, pyridine-aluminium chloride, sulfuric acid monohydrate, or chlorosulfonic acid, whereby compounds are obtained which probably correspond to the carbazole type.

My new products are valuable vat dyestuffs of excellent fastness properties. They dye vegetable fibers from the vat red, brown, violet or green shades.

The starting materials can be obtained by acylating 1,5-diamino - 3,7 - dihalogenanthraquinones or 1,8-diamino-3,6-dihalogenanthraquinones.

The following examples illustrate the invention without, however, restricting it thereto, the parts being by weight:

Example 1

15 parts of 1,5-dibenzoylamino-3,7-dichloroanthraquinone are heated to boiling with 7.5 parts of 1-aminoanthraquinone, 10 parts of sodium carbonate, 0.3 part of copper acetate and 100 parts of nitrobenzene for 12 hours while stirring. The dyestuff thus obtained containing one exchangeable chlorine substituent is filtered with suction at 50° C., washed with nitrobenzene and alcohol and boiled out with water. It represents a red powder soluble in concentrated sulfuric acid with a green coloration which after a short time turns to blue. The dyestuff dyes cotton from a reddish brown vat brownish red shades. It is of excellent fastness properties to light and to chlorine.

Example 2

A mixture of 15 parts of 1,5-dibenzoylamino-3,7-dibromoanthraquinone, 20 parts of 1-aminoanthraquinone, 20 parts of sodium carbonate, 0.5 part of copper acetate and 200 parts of nitrobenzene is heated to boiling for 20 hours while stirring. The dyestuff thus obtained is filtered with suction at 50° C., washed with nitrobenzene and alcohol and boiled out with water. It represents a dark red powder soluble in concentrated sulfuric acid with a green coloration which after a short time turns to blue. The dyestuff dyes cotton from a reddish brown vat red shades. It is of excellent fastness properties to light and to chlorine.

Example 3

A mixture of 15 parts of 1,5-dibenzoylamino-3,7-dichloroanthraquinone, 24 parts of 1-benzoylamino-5-aminoanthraquinone, 10 parts of sodium carbonate, 0.3 part of copper acetate and 200 parts of nitrobenzene are heated to boiling for 20 hours while stirring. The dyestuff thus obtained is filtered with suction at 50° C., washed with nitrobenzene and alcohol and boiled out with water. It represents a dark red powder which is soluble in concentrated sulfuric acid with a brown coloration. The dyestuff dyes cotton bluish red.

Example 4

A mixture of 10 parts of 1,5-diacetylamino-3,7-dichloroanthraquinone, 15 parts of 1-amino-4-benzoylamino-anthraquinone, 10 parts of sodium carbonate, 0.3 part of copper acetate and 200 parts of nitrobenzene are heated to boiling for 20 hours while stirring. The dyestuff thus obtained is filtered with suction at 50° C., washed with nitrobenzene and alcohol and boiled out with water. It represents a blue powder which is soluble in concentrated sulfuric acid with a green coloration. The dyestuff dyes cotton currant shades.

*Example 5*

A mixture of 15 parts of 1,8-dibenzoylamino-3,6-dichloroanthraquinone, 20 parts of 1-aminoanthraquinone, 20 parts of sodium carbonate, 0.3 part of copper acetate and 200 parts of nitrobenzene are heated to boiling for 20 hours while stirring. The dyestuff thus obtained is filtered with suction, washed with nitrobenzene and alcohol and boiled out with water. It is soluble in concentrated sulfuric acid with a green coloration and dyes cotton from a reddish brown vat reddish violet shades.

*Example 6*

A mixture of 15 parts of 1,8-dibenzoylamino-3,6-dichloroanthraquinone, 24 parts of 1-amino-4-benzoylamino-anthraquinone, 20 parts of sodium carbonate, 0.3 part of copper acetate and 200 parts of nitrobenzene are heated to boiling for 15 hours while stirring. The dyestuff thus obtained represents a blue powder which is filtered with suction at 50° C., washed with nitrobenzene and alcohol and boiled out with water. It is soluble in concentrated sulfuric acid with a green coloration and dyes cotton from a reddish brown vat blue shades.

*Example 7*

A mixture of 10 parts of the dyestuff obtainable according to Example 1 which contains one exchangeable halogen substituent, 10 parts of 1-amino-5-benzoylamino-anthraquinone, 10 parts of sodium carbonate, 0.2 part of copper acetate and 150 parts of nitrobenzene are heated to boiling for 20 hours while stirring. The dyestuff thus obtained is filtered with suction at 50° C., washed with nitrobenzene and alcohol and boiled out with water. It represents a dark red powder soluble in concentrated sulfuric acid with a dull green coloration which after a short time turns to blue. The dyestuff dyes cotton from a reddish brown vat copper-red shades of excellent fastness properties to light and to chlorine.

*Example 8*

10 parts of the dyestuff obtainable according to Example 7 are kept in solution with 100 parts of concentrated sulfuric acid (of 96 per cent) for some hours at temperatures below 25° C. The new dyestuff is poured on to ice, filtered with suction and washed in a neutral solution. It dyes cotton from a brown vat brown shades.

*Example 9*

10 parts of the dyestuff obtainable according to Example 6 are heated to boiling with 20 parts of aluminium chloride and 50 parts of anhydrous pyridine while stirring, until the original coloration of the mixture has completely changed. Then the solution is diluted with water and soda lye the pyridine being removed by steam distillation. The dyestuff thus obtained is aftertreated with hypochlorite, filtered with suction and washed out. It represents a brown powder which dyes cotton from a brown vat brown shades.

I claim:

1. Vat dyestuffs of the anthraquinone series selected from the group consisting of the following types:

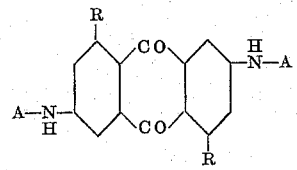

and

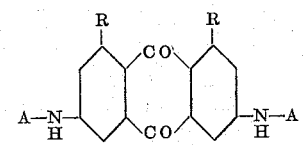

wherein R represents an acylamino group and A represents an anthraquinone.

2. Vat dyestuffs of the anthraquinone series selected from the group consisting of the following types:

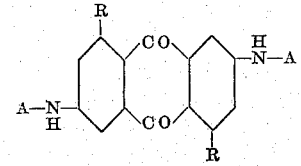

and

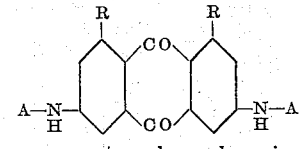

wherein R represents a benzolyamino group and A represents an anthraquinone.

3. The compound of the following formula

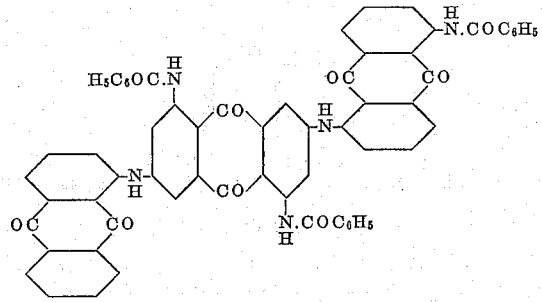

4. The compound of the following formula

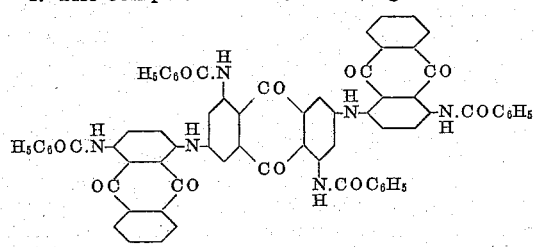

KARL KUPPE.